United States Patent [19]
Ashton et al.

[11] Patent Number: 5,578,673
[45] Date of Patent: Nov. 26, 1996

[54] POLYMERISABLE COMPOSITIONS

[75] Inventors: David P. Ashton, Warrington; Geraldine A. Moorman, Leyland; Roger N. Rothon, Guilden Sutton, all of United Kingdom

[73] Assignee: Imperial Chemical Industries PLC, London, England

[21] Appl. No.: 462,067

[22] Filed: Jun. 5, 1995

Related U.S. Application Data

[62] Division of Ser. No. 244,264, Oct. 4, 1994.

[30] Foreign Application Priority Data

| Nov. 15, 1991 | [GB] | United Kingdom | 9124305 |
| Nov. 15, 1991 | [GB] | United Kingdom | 9124307 |
| Nov. 15, 1991 | [GB] | United Kingdom | 9124309 |

[51] Int. Cl.$^6$ .................................................. C08K 3/34
[52] U.S. Cl. ............................................ 524/517; 524/534
[58] Field of Search .................................... 524/517, 534

[56] References Cited

U.S. PATENT DOCUMENTS

| 3,981,851 | 9/1976 | Plueddemann | 525/102 |
| 4,146,529 | 3/1979 | Yamamoto et al. | 525/102 |
| 5,223,575 | 6/1993 | Mori et al. | 525/102 |

FOREIGN PATENT DOCUMENTS

| 240044 | 10/1987 | European Pat. Off. . |
| 295005 | 12/1988 | European Pat. Off. . |
| 1493393 | 11/1977 | United Kingdom . |

*Primary Examiner*—Bernard Lipman
*Attorney, Agent, or Firm*—Cushman Darby & Cushman, L.L.P.

[57] ABSTRACT

A polymeric dispersant having a low $T_g$ polymer component, e.g. polybutadiene, and a pendant silylated group with hydrolysable groups capable of associating with and dispersing. finely divided inorganic fillers. Curable compositions containing the polymeric dispersant can be cured into composite materials having improved resistance to stress induced by thermal cycling.

20 Claims, No Drawings

POLYMERISABLE COMPOSITIONS

This is a division of application Ser. No. 08/244,264, filed Oct. 4, 1994.

This invention relates to novel polymeric materials suitable for use as dispersants of filler materials at high concentration in curable, fluid organic materials, to the compositions produced and cured composites obtainable therefrom.

Composites of highly filled polymeric compositions are becoming increasingly used as materials of construction, particularly for kitchen sinks, kitchen surfaces and sanitaryware, because of their attractive appearance and hard wearing properties. Fluid, curable compositions containing high volumes of finely divided fillers suitable for forming such articles have been described in British Patent No. 1 493 393. This specification describes fluid, curable compositions wherein high volumes of filler of specified particle size are dispersed in a curable material using polymeric dispersants. The use of polymeric dispersants enable compositions to be obtained containing high volumes of finely divided fillers, for example 50% by volume, which have a remarkably low viscosity enabling the compositions to be readily handled for example by pumping. This low viscosity, in turn, enables the compositions to be sold as fluid dispersions which can be readily transported to fabricators who can mould articles in inexpensive low pressure moulds. Although some sedimentation will inevitably occur on storage, the polymeric dispersant maintains the filler particles in a state of stable, deflocculation so that the sediment can be readily redispersed by mild agitation to give a dispersion in which the filler particles are substantially uniformly dispersed and will remain so whilst the composition is converted from a fluid dispersion to a fully cured composite. The presence of the polymeric dispersant, and its function of keeping the particles in a state of stable deflocculation, not only enables a low viscosity, redispersible dispersion to be obtained, but ensures that compatibility of the components is maintained as the composition is cured so that a cured product free from cracks and flaws is obtained.

It is also possible to fabricate moulded articles which have a viscosity too high to be of practical value as transportable, low viscosity, redispersible compositions. Nevertheless, these compositions are useful where the fabrication operation is carried out at the same location as the composition is prepared and where storage and redispersion are not a problem. These compositions must also contain fillers which are properly dispersed within the curable composition to avoid problems of flocculation and cracking on polymerisation.

An improved polymeric dispersant has now been developed for use in highly filled curable compositions which in addition to providing a dispersant effect can confer other benefits, particularly on the cured compositions.

According to a first aspect of the present invention there is provided a polymeric dispersant comprising (a) a polymeric component containing at least one segment of low Tg polymeric material having a Tg of less than 0° C., preferably less than −25° C., and (b) silicon containing groups of the formula (I)

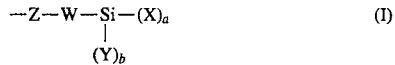

which are pendant from the polymeric component and wherein

X is a hydrolysable group such as halogen, alkyl carboxylate, alkoxy carbonyl or a lower hydrocarbyl radical, preferably an alkoxy radical having from 1 to 6 carbon atoms, Y is a hydrocarbyl radical such as an alkyl radical, a is an integer of 1 to 3 b is 0 or an integer of 1 to 2 and a+b equals 3,

Z is a group resulting from the reaction of a functional group pendant from the polymeric component and a corresponding reactive group on a precursor of the silicon containing group and W is a direct bond or a hydrocarbyl radical containing from 1 to 20 carbon atoms, which may optionally contain a functional group.

The functional groups pendant from the polymeric component through which the silicon containing group is to be linked include carboxylic acid, anhydride, hydroxyl ester, imide, amine, amide, epoxy and acid chloride groups.

Vinyl double bonds are also to be regarded as functional groups in the context of this invention, The functional groups are preferably pendant from the at least one segment of low Tg polymeric material.

The corresponding reactive group on the precursor of the silicon containing group include amine, mercapto, epoxy, anhydride and isocyanate groups. A preferred combination is the use of an aminosilane linked to anhydride functionalisation on the polymeric component.

The polymeric component may consist wholly of the at least one segment of low Tg polymeric material, for example a homopolymer of 1,3 butadiene, a homopolymer of cyclo octadiene, a copolymer of ethylene and propylene or a copolymer of ethylene, propylene and a diene. Alternatively, the polymeric component may also contain segments of other polymeric material, for example as in block copolymers obtained from an aromatic vinyl compound and a conjugated diene compound or selectively hydrogenated versions of such block copolymers.

Functionalised variants of such polymeric components have been previously described and are commercially available in several forms. Selectively hydrogenated block copolymers modified with acid compounds are described, for example, in U.S. Pat. No. 4,578,429 and are commercially available from Shell Oil Company as the Kraton G series of polymers.

When using a polymeric component functionalised with an acid or anhydride it is preferred that the precursor of the silicon containing compound with which it is reacted is an amino silane, resulting in an amide group linking the polymeric component and the silane residue.

The silicon containing group (I) comprises at least one hydrolysable group in order to provide a group which will affect anchoring to the surface of particles of inorganic fillers.

In order to act as an efficient dispersing agent for finely divided fillers in curable organic liquids, the polymeric component must be chosen so as to have affinity with, and preferably be soluble in, the curable organic liquid. Where the curable organic liquid contains an acrylate or methacrylate monomer such as methyl methacrylate as a major polymerisable component this affinity can be achieved, for example, using polybutadiene as the polymeric component. Yet again selectively hydrogenated styrene/butadiene block copolymers derive their compatibility or solubility in methyl methacrylate through the styrene blocks in the copolymer.

In addition to being very efficient dispersing agents for finely divided inorganic fillers, the products of the invention can be designed to provide additional functions, such as providing coupling between the inorganic filler and the matrix polymer obtained when the curable liquid is cured. The products of the invention also provide very substantial scope for providing a component which affects the performance of the overall composite to mechanical and thermal shock in addition to performing a dispersant and, optionally, a coupling function.

The products of the invention can be coupled to polymer matrices produced by polymerising ethylenically unsaturated compounds if the polymeric component in the dispersant itself contains significant residual ethylenic unsaturation, such as found in polybutadiene. In polybutadiene this residual unsaturation may result from a 1,2 or 1,4 configuration of polymerised butadiene units.

It is preferred that polymeric components having a high level of 1,2 unsaturation are used where the colour of the cured composite is an important consideration because the degree of yellowing is minimised with such polymers.

The benefits which the dispersants of the invention confer on moulded articles cured from compositions containing the dispersants can be assessed by a number of tests. Standard impact strength tests can be performed on test pieces according to the Charpy unnotched impact method of ASTM D256, Method B.

More practical tests which attempt to measure the performance of the articles in service use include a test in which hot and cold water jets are successively directed on to a moulded article and the number of cycles before failure occurs is recorded. This test, termed 'thermal shock test' appears to be largely determined by the interface at the filler surface. In a related test, hereinafter termed the damage tolerance thermal shock test, in which the article surface is deliberately scratched in a controlled manner before being subjected to the thermal shock test, the nature of the matrix polymer appears to exert a greater influence and improvements can be obtained by significantly increasing the strain to failure for the cured composite material. Improved performance with regard to each and both of these tests can be achieved using dispersants according to the invention. Polymeric dispersants comprising polymeric components having at least one segment of low Tg polymeric material of low molecular weight can act as very efficient dispersion agents and effect a strong bond to the inorganic filler, and, optionally, between the dispersant and the matrix. Such polymeric dispersants can provide a marked improvement in the non-scratched thermal shock performance when used at concentrations as low as 0.5% by weight of the composition but without showing a significant improvement in the scratched thermal shock test. When the polymeric component contains at least one segment of low Tg polymeric material having a molecular weight of greater than about 5,000 significant improvements in the damage tolerance thermal shock performance can be observed. This improvement is accompanied by a change in the nature of the matrix as shown by a significant increase in the strain to failure value for the composite. A cured composite material formed from a curable composition containing as little as 1.5% by weight of a polymeric dispersant comprising such a polymeric component can have double the strain to failure value as compared to that of a cured composite formed from the same curable composition not containing such a polymeric dispersant.

When it is desired to obtain a significant improvement in the damage tolerance test it is necessary that the at least one segment of low Tg polymeric material is present after the curing process and that it has not become cross-linked to such an extent that it is no longer of low Tg. It is generally possible to observe the presence of a low Tg polymeric material in a cured moulding using dynamic mechanical thermal analysis testing (DMTA) to provide a check that the low Tg polymeric material has not been changed during the curing process so as to lose its rubberiness.

It is desirable to achieve a desired performance with a minimum quantity of the polymeric dispersants of the invention and in general a concentration of from 0.2 to 7, preferably 0.5 to 5.0% by weight of the curable composition gives a satisfactory performance although up to 10% or more may be used if required within the limits of the solubility of the polymeric dispersant in the curable organic liquid.

When the polymeric component is a polybutadiene homopolymer it is preferred that the molecular weight (Mn) polybutadiene homopolymer is at least 5000 to achieve a significant increase in strain to failure, and to produce damage tolerant compositions.

Lower molecular weight low Tg polymeric materials will still give adequate improvement in resistance to thermal shock in the non-scratched test. In a vinyl aromatic/conjugated diene block copolymer and selectively hydrogenated variants thereof the polymerised conjugated diene hydrocarbon block should preferably have an average molecular weight of at least 20,000 whereas the polymerised monoalkenyl aromatic hydrocarbon block should preferably have an average molecular weight of at least 2,000 and not more than 115,000. The weight percentage of the monoalkenyl aromatic block in the block copolymer is preferably less than 35% when the polymeric dispersant derived from these block copolymers is required to confer optimum resistance to thermal and mechanical shock.

According to a second aspect of the present invention there is provided a highly, filled curable composition comprising (A) an addition polymerisable organic liquid which on curing forms a solid polymer:

(B) 20 to 80% by volume of a finely divided particulate filler having a weight average particle size of less than 50 microns but not having a BET surface area of more than 30 $m^2.cm^{-3}$; and (C) a polymeric dispersant as hereinbefore described.

In curable compositions according to the second aspect of the present invention the polymerisable organic liquid should preferably have a viscosity below 1,000 centipoise, more preferably below 100 centipoise, as measured at ambient temperatures using a Brookfield viscometer. Particularly preferred polymerisable organic liquids have a viscosity of up to 50 centipoise. More particularly, the polymerisable organic liquid is one which cures to form a polymer having a glass transition temperature of at least 60° C., preferably of at least 80° C. and more preferably of at least 100° C.

Preferred polymerisable organic liquids comprise at least one mono olefinically unsaturated monomer which may be selected from any of the mono olefinically unsaturated monomers known in the art.

Suitable mono olefinically unsaturated monomers may be selected from the acrylic type monomers such as acrylic, methacrylic and chloroacrylic acids (i.e. $CH_2=CHClCO.OH$), acrylamide and methacrylamide, acrylonitrile and methacrylonitrile, alkoxyalkyl acrylamides and methacrylamides, e.g. butoxymethyl acrylamide and methoxymethyl methacrylamide, hydroxyalkyl acrylamides and methacrylamides, e.g. N-methylol acrylamide and methacrylamide, the metal acrylates and methacrylates, and the esters of acrylic, methacrylic and chloroacrylic acids with alcohols and phenols; the vinyl aromatic compounds, e.g. styrene and substituted derivatives thereof such as the halogenated derivates thereof and vinyl toluene, the vinyl esters, e.g. vinyl acetate, and vinyl pyrrolidone.

In a preferred polymerisable organic liquid, the mono olefinically unsaturated monomer is an acrylic or methacrylic acid ester having the formula $CH_2=C(R)CO.OR^2$ where R is H or methyl, especially methyl, and $R^2$ is optionally substituted hydrocarbyl (e.g. optionally halo or hydroxy substituted hydrocarbyl) and in particular is a $C_{1-8}$alkyl, a $C_{6-10}$ cycloalkyl or a $C_{6-10}$ aryl group.

Specific examples of such monomers include the non-substituted esters of acrylic and methacrylic acids such as methyl methacrylate, ethyl methacrylate, isopropyl methacrylate, isobutyl methacrylate, cyclohexyl methacrylate, isobornyl methacrylate, benzyl methacrylate, phenyl methacrylate and isobornyl acrylate and the substituted esters of acrylic and methacrylic acids such as hydroxyethyl methacrylate and hydroxypropyl methacrylate. More particularly, the mono olefinically unsaturated monomer incorporated in the polymerisable organic liquid is a $C_{1-8}$alkyl ester of methacrylic acid. Methyl methacrylate is an especially preferred monomer.

The polymerisable organic liquid may comprise a mixture of mono olefinically unsaturated monomers, for example a mixture of the mono olefinically unsaturated monomers specified as preferred above.

The preferred polymerisable organic liquids may also comprise at least one polyolefinically unsaturated monomer so that the polymer which forms on curing the polymerisable organic liquid is a cross-linked polymer. Suitable polyolefinically unsaturated monomers may be selected from those known in the art. Preferred polyolefinically unsaturated monomers are the poly(meth)acrylate esters of an organic polyol and acrylic or methacrylic acid having the formula:

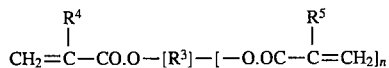

wherein $R^3$ is the hydroxy free residue of an organic polyol which comprised at least two hydroxyl groups in the molecule bonded to different carbon atoms;

$R^4$ and $R^5$ are each independently hydrogen or methyl; and n is an integer having a value of at least 1, preferably a value of from 1 to 3.

Suitable poly(meth)acrylates of this type include, inter alia, the mono-, di-, tri- and tetra-alkylene glycol di(meth)acrylates such as 1,3-butylene glycol dimethacrylate, 1,3-butylene glycol diacrylate, ethylene glycol diacrylate. ethylene glycol dimethacrylate, triethylene glycol diacrylate, triethylene glycol dimethacrylate and tetraethylene glycol dimethacrylate, and the trialkylolalkane tri(meth)acrylates such as trimethylolpropane trimethacrylate and trimethylolpropane triacrylate. Other suitable poly(meth)acrylates may be selected from the polyalkylene glycol di(meth)acrylates, such as polyethylene glycol dimethacrylate the bisphenol di(meth)acrylates, such as Bisphenol A dimethacrylate, and the di(meth)acrylates of the alkoxylated bisphenols, such as the dimethacrylate of an ethoxylated and/or propoxylated derivative of Bisphenol A. The poly(meth)acrylate monomer may also be an acrylated or methacrylated epoxy resin, for example the product derived by reacting methacrylic acid with an epoxy resin which is the reaction produce of a bisphenol, such as Bisphenol A, and a halohydrin, such as epichlorohydrin. Mixtures of poly(meth)acrylate monomers may be used if desired.

More particularly, the poly(meth)acrylate monomer is a mono-, di-, tri- or tetra- alkylene glycol di(meth)acrylates or a trialkylolalkane tri(meth)acrylates, especially the former. A particularly preferred poly(meth)acrylate is ethylene glycol dimethacrylate.

The polymerisable organic liquid will usually comprise (by weight) from 0.2 to 20, for example from 0.5 to 20%, more usually from 0.5 to 15%, for example from 1.0 to 15%, by weight, and preferably from 0.5 to 10%, for example from 1.0 to 10%, of the at least one polyolefinically unsaturated monomer, and usually from 99.8 to 80%, for example 99.5 to 80%, more usually from 99.5 to 85%, for example 99 to 85%, and preferably from 99.5 to 90%, for example from 99 to 90% by weight of the at least one olefinically unsaturated monomer.

However, certain polyolefinically unsaturated monomers may be employed in higher concentrations, e.g. the polyalkylene glycol di(meth)acrylates and the di(meth)acrylates of the alkoxylated bisphenol derivatives. A polymerisable organic liquid comprising such monomers may comprise up to 70% by weight thereof. e.g. up to 50% by weight.

The inorganic fillers which may be dispersed in the curable compositions by use of the dispersant of the invention comprise any suitable finely divided particulate inorganic filler in the polymerisable organic liquid.

Suitable inorganic fillers may include amphoteric, basic and silicaceous fillers, and may be of natural or synthetic origin. The inorganic filler, if amphoteric, may, for example, be an oxide of this type. Suitable such inorganic fillers include oxides and hydroxides of aluminium, including hydrated alumina. The inorganic filler, if basic, may, for example, be an oxide, a hydroxide, a carbonate or a basic carbonate. Suitable inorganic fillers of this type include, inter alia, the oxides, hydroxides, carbonates and basic carbonates of alkaline earth metals and of zinc. Suitable silicaceous fillers include, inter alia, substantially pure silica, for example sand, quartz, cristobalite and precipitated or fused silica, or the metal silicates or aluminosilicates. Further useful inorganic fillers may be selected from the metal aluminates, phosphates, sulphates, sulphides and carbides. Silicaceous fillers are preferred, especially the silica fillers.

When the inorganic filler is to be used in a composition of the type described in British Patent Specification 1 493 393 providing a stably deflocculated redispersible dispersion the inorganic filler should be one in which the maximum size of any particle present is 100 microns, and at least 95% by number of the particles are of a size 10 microns or less, and where the particles have a surface area of from 30 $m^2.cm^{-3}$ to 1 $m^2.cm^{-3}$ (approximately from 10 $m^2.g^{-1}$ to 0.4 $m^2.g^{-1}$), preferably from 20 $m^2. cm^{-3}$ to 2 $m^2.cm^{-3}$ (approximately from 8.5 $m^2.g^{-1}$ to 0.8 $m^2.g^{-1}$), as determined by the B.E.T. nitrogen absorption method.

Preferably more than 99% by number of the particles are of a size 10 microns or less, and in general the nearer the number proportion of such particles approaches 100% the better, e.g. a proportion of 99.999% by number of a size 10 microns or less gives very satisfactory results. It is at the same time preferred that the maximum size of any particles present should be 75 microns, even more preferred that the maximum size should be 50 microns. The inorganic filler particles for use in the invention may have any form suitable for a filler, e.g. they may be of granular, fibrillar or laminar form.

In compositions having less exacting requirements, for example, where the composition is to be made up and cured in the same processing facility (in-house) and where it is not necessary to provide a dispersion which is readily pumpable from drums and which can be redispersed after storage, it is not necessary for the particle size to be so critical. For such compositions the particle surface area may be less than 1 $m^2.cm^{-3}$ and, for example, the weight average particle size may be as much as 50 microns or more although is preferably less than 50 microns. The BET particle surface area should be less than 30 $m^2.cm^{-3}$.

Curable compositions may readily be prepared, typically containing from 20 to 80% by volume of the finely divided inorganic filler. Preferably the concentration of the inorganic filler is from 30% to 75% by volume and more preferably from 40 to 70% by volume of the total volume of the curable composition.

Where the inorganic filler is already available in the required particle size, the particles of inorganic filler can be dispersed in the curable compositions using techniques known in the art. Mixing processes such as roll milling or high shear mixing may be used to disperse the inorganic filler. For example, the inorganic filler may be mixed with the polymerisable organic liquid or a portion thereof to form a filler/liquid mixture into which is added the copolymer dispersant, e.g. as a solution in a component of the polymerisable organic liquid, with mixing. A further suitable technique involves blending the inorganic filler in a component of the polymerisable organic liquid and then blending the resulting mixture with the remaining components of the curable composition. Alternatively, the finely divided particles may be produced directly in the presence of the curable composition, or in a liquid component thereof, by comminution of coarse particles. Comminution of coarse material to yield smaller size particles can be readily carried out using conventional ball mills, stirred ball mills or vibratory mills.

Where the dispersion need not be limited to a stably deflocculated redispersible dispersion, i.e. a level of non-redispersion can be tolerated, the inorganic filler used to produce curable compositions may also comprise a coarse filler material, e.g. a filler material the particles of which have a mean size across their largest dimension of at least 100 microns, e.g. greater than 200 microns, and typically within the range 100 to 500 microns, e.g. 200 or 300 microns. Such compositions are useful where it is required to produce a surface rich in larger filler particles or where some special aesthetic effect such as a simulated granite effect is required.

When a curable composition is produced using a dispersant of the invention which does not itself have adequate coupling properties, the compositions may comprise a coupling agent providing active groupings to promote polymer matrix/filler particle bonding. Suitable added coupling agents comprise one or more groups capable of interacting with groups in the particulate inorganic filler, and also one or more addition polymerisable double bonds which can co-react with the constituents of the polymerisable organic liquid. Suitable coupling agents, particularly when silicaceous fillers are employed, are the trialkoxysilyl alkyl methacrylates such as 3-(trimethoxysilyl) propyl methacrylate.

Curable compositions may also comprise one or more preformed polymers which may be in solution in the polymerisable organic liquid, for example, a partially polymerised syrup of the polymerisable organic liquid.

Alternatively they may be present in a state of dispersion therein. Preformed polymers may also be included as a thickening aid to adjust the viscosity of the curable compositions.

Curable compositions may also comprise any of the additives that are conventionally used in curable moulding compositions such as pigments, dyestuffs, mould release agents and polymerisation inhibitors.

Curable compositions are usefully employed in the manufacture of moulded articles. Fluid curable compositions having a low viscosity obtainable using the dispersants of the invention are particularly suitable for moulding applications and, accordingly preferred curable compositions will have a viscosity, as measured when the inorganic filler is dispersed in the polymerisable organic liquid, of less than 5000 centipoise at ambient temperatures. More particularly, compositions having a viscosity, as measured when the filler is so dispersed, in the range of from 50 to 2000 centipoise and especially in the range of from 50 to 1000 centipoise are preferred.

According to a third aspect of the present invention there is provided a composite material obtained by curing a highly filled curable composition according to the invention. Although the composite material may be a flat sheet the ready handling of the dispersions makes them ideally suited for moulding shaded articles such as kitchen sinks, vanity bowls and other articles of sanitaryware, including baths.

Moulded articles may be fabricated using techniques conventional in the art. For example, the curable composition can be cast into a mould and then in-mould polymerised using a suitable catalyst to initiate the polymerisation reaction.

The curable compositions may be cured in accordance with techniques conventional in the art of free radical addition polymerisation. The polymerisation may be initiated by a wide range of catalysts, but it is preferred to use a heat activated catalyst, particularly one which is activated at temperatures of from 30° to 120° C. The catalyst is preferably added immediately prior to curing the compositions; this may be particularly important where the catalyst is activated at temperatures below or around ambient. Suitable catalysts are well known to those skilled in the art and may include, for example, organic peroxides, such as dibenzoyl peroxide, diocatanoyl peroxide and di-t-butyl peroxide, which may be used in conjunction with an amine accelerator, e.g. N,N-diethylaniline or N,N-dimethyl-para-toluidine, the hydroperoxides, such as t-butyl hydroperoxide; the peroxydicarbonates, such as diisopropylperoxydicarbonate, di-n-propylperoxydicarbonate, di-(2-ethoxyethyl)-peroxydicarbonate, di-(methoxyisopropyl)-peroxydicarbonate. di-(2-ethylhexyl)-peroxydicarbonate and bis(4-t-butylcylcohexyl)peroxydicarbonate; and the peresters. The most preferred catalysts are the peroxydicarbonates. The catalyst is conveniently used in an amount ranging from 0.1% to 3.5% by weight based on the total weight of the polymerisable organic liquid.

It may be desirable during the filling of the mould to maintain the temperature of the mould surfaces below the temperature at which the catalyst is activated, so as to prevent premature polymerisation and gelation.

Prior to moulding, the internal mould surfaces my be coated with a release agent to prevent adhesion of the cured materials to the mould and to obtain a good surface finish. These techniques are well known in the art.

Examples of suitable external mould release agents include, inter alia, polytetrafluoroethylene, silicone and polyvinylalcohol.

After the in-mould polymerisation is complete, the filled polymeric article may be subjected to an in-mould post-curing process, after which it is demoulded, or, alternatively, it may be demoulded immediately and then optionally subjected to a post-curing process.

The invention is further illustrated by reference to the following examples.

EXAMPLE 1

0.62g of aminopropyltriethoxysilane was added to 30 g of 10 w/w solution in methyl methacrylate of a 1,4 maleinised polybutadiene having a molecular weight (Mn) of 8000 and containing 10 phr (parts per hundred of resin) by weight of grafted maleic anhydride. The solution was maintained at 21° C. for 45 minutes after which time the infra red spectroscopy peaks present in the initial mixture at 1855 and 1778 cm$^{-1}$ corresponding to anhydride carbonyl groups in the polymer were reduced to less than 1% of their initial height indicating virtually complete reaction.

EXAMPLE 2

0.62 g of aminopropyltriethoxysilane was added to 30 g of 10 w/w solution in methyl methacrylate of a 1,4 maleinised polybutadiene having a molecular weight (Mn) of 8000 and containing 10 phr by weight of grafted maleic anhydride.

The solution was maintained at 70° C. for 15 minutes after which time the infra red spectroscopy peaks present in the initial mixture at 1855 and 1778 cm$^{-1}$ corresponding to anhydride carbonyl groups in the polymer were reduced to less than 1% of their initial height indicating virtually complete reaction.

EXAMPLE 3

1.66 g of aminopropyltriethoxysilane was added to a 10% wt/vol solution of 'Kraton' FG1901X in methyl methacrylate. 'Kraton' FG1901X is a maleinised styrene-ethylene/butylene-styrene block copolymer available from the Shell Chemical Company. The polymer has a styrene content of about 28% by weight and a functionality (as bound maleic anhydride) of 2% by weight. After holding the solution for 45 minutes at 25° C. the infra red peaks indicating the presence of anhydride carbonyl groups had disappeared.

EXAMPLE 4

To a solution containing 10 g of the polymer product of Example 1 in 130 g methyl methacrylate was added 360 g of cristobalite silica having a mean weight average particle size of 10 microns. After 30 minutes rolling a free flowing dispersion was formed. The viscosity of the dispersion was measured as 280 centipoise using a Brookfield viscometer. (No. 3 spindle. 30 rpm.)

The procedure was repeated using the above ingredients except in that the product of Example 1 was replaced by a further 10 g of methyl methacrylate. The mixture was of too high a viscosity to measure (>10,000 cP).

EXAMPLE 5

1.5 g of the product of Example 3 was added to 125 g methyl methacrylate, followed by 360 g of the cristobalite silica used in Example 4. After rolling for 30 minutes a free flowing dispersion had formed having a viscosity of 280 centipoise as measured by the method of Example 4. After 10 days further rolling the viscosity was 270 centipoise.

Comparative Example A

A silylated polybutadiene was prepared by hydrosilylation (using triethoxysilane) of polybutadiene having a molecular weight of 8000 (obtainable from Revertex as Lithene LX16). 10 g of this product was dissolved in 130 g of methyl methacrylate which was added to 360 g of the silica used in Example 4. After 30 minutes rolling the viscosity was greater than 10,000 centipoise as measured by the method described in Example 4. This procedure was repeated using a silylated polybutadiene (using triethoxysilane) available from Dynamit Nobel under product number PS076.5. After 30 minutes of rolling the mixture had a viscosity greater than 10,000 centipoise.

Comparative Example B 15 g of 'Kraton' FG1901X (as used and described in Example 3) dissolved in 125 g of methyl methacrylate was added to 360 g of the silica used in Example 4. The viscosity was measured using a Brookfield viscometer after 1 hour, 4 days, and 7 days and found to be 260, 480 and 1160 centipoise respectively.

EXAMPLE 6

The following ingredients were mixed in a 25 liter drum and rolled at approximately 30 rpm for 24 hours.

| Methyl methacrylate | 7.85 kg |
| Ethylene glycol dimethacrylate | 0.092 kg |
| Silylated maleinised polybutadiene as prepared in Example 1 | 0.61 kg |
| Stearic acid | 0.045 kg |
| Cristobalite silica as used in Example 4 | 22 kg |

A free flowing dispersion was obtained having a viscosity of 200 centipoise measured by the method described in Example 4.

The dispersion was cured in the form of plaques (dimensions 300 mm×300 mm×5 mm) and kitchen sinks after catalysing with 0.6% by weight of the dispersion of Perkadox 16 catalyst (bis(4-t-butyl-cyclohexyl) peroxydicarbonate) (available from Akzo) using the appropriate moulds. The curing cycle for moulding plaques was 30 minutes at 60° C. followed by 45 minutes at 90° C. The curing cycle for moulding sinks was 80° C. on show face and 50° C. on back face for 15 minutes, followed by 100° C. on show face and 100° C. on back face for 15 minutes. The moulding pressure was held at 2 bar for 10 minutes followed by 4.5 bar for 20 minutes.

The plaques were cut into test pieces for measurement of modulus, failure stress, failure strain and impact strength. The test methods were the three point bend flexural test, ASTM D790-71 and the Charpy unnotched impact test, ASTM D256 Method B.

The values measured are recorded below:

| Modulus | GPa | 10.6 |
| Failure stress | MPa | 125 |
| Failure Strain | % | 2.1 |
| Impact Strength | kJ · m$^{-2}$ | 7.8 |

The thermal shock performance of the moulded sinks were assessed by the following method. Hot and cold water were alternately, and repeatedly, jetted onto the base of the sink; the sink was continually observed and the number of cycles to failure or damage was measured. Each heating and cooling cycle was as follows: hot water at 93° C.±2° C. was jetted onto the base of the sink for 90 seconds, followed by a dwell time of 30 seconds during which time there was no flow of water, then cold water 15° C.±5° C. was jetted onto the base of the sink for 90 seconds, followed by a further dwell time of 30 seconds.

Using this test a value of 2300 cycles before failure (average of two tests) was observed.

EXAMPLE 7a

The procedure of Example 6 was followed using a composition of the following ingredients:

| | | |
|---|---|---|
| Methyl methacrylate | | 7.45 kg |
| Ethylene glycol dimethacrylate | | 0.092 kg |
| Silylated Kraton FG1901X as prepared in Example 3 | | 0.92 kg |
| 3-(trimethoxysilyl)propylmethacrylate | | 0.088 kg |
| Stearic acid | | 0.045 kg |
| Cristobalite silica as used in Example 4 | | 22 kg |

A free flowing dispersion having a viscosity of 410 centipoise measured by the method described in Example 4 was obtained.

The following properties were measured using the test methods described in Example 6 on samples cut from moulded plaques:

| | | |
|---|---|---|
| Modulus | GPa | 9.6 |
| Failure Stress | MPa | 104 |
| Failure Strain | % | 2.8 |
| Impact Strength | kJ · m$^{-2}$ | 8.8 |

A sample of the plaque was also analysed by Dynamic Mechanical Thermal Analysis (DMTA) to determine Tg transitions. The transitions were derived from a peak maximum in a loss modulus (E") curve obtained using a Polymer Laboratories DMT analyser, using a heating rate of 2° C. min$^{-1}$ and a force frequency of 10 Hertz. E" loss modulus peak maximums were observed at −40° C. and 120° C.

The peak at −40° C. corresponds to a peak at −45° C. observed in the Kraton additive itself. The peak at 120° C. corresponds to the E" loss modulus peak maximum of polymethyl methacrylate and indicates that the low Tg material is present as a separate phase and has not affected the Tg of the matrix polymer.

The average value for failure in the Thermal Shock test was 1350 cycles.

The damage tolerance thermal shock test involved using the same heating and cooling cycle described in Example 6 but the sink was previously scratched by drawing a device in which a 'Stanley Knife Blade' was protruding by 1 mm from a flat surface which was drawn across the surface of the base of the sink. A scratch of 2.5 cm in length was made at the point of impingement of the water jet. The sinks were observed during the thermal cycling and cycles to failure or damage were recorded.

In the damage tolerance thermal shock test minor damage was observed at 281 cycles, and failure occurred at 471 cycles.

EXAMPLE 7b

Example 7a was repeated using the following composition which has a slightly increased proportion of silylated Kraton.

| | | |
|---|---|---|
| Methyl methacrylate | | 7.055 kg |
| Ethylene glycol dimethacrylate | | 0.078 kg |
| Silylated Kraton FG1901X as prepared in Example 3 | | 0.915 kg |
| 3-(trimethoxysilyl)propylmethacrylate | | 0.080 kg |
| Stearic acid | | 0.041 kg |
| Cristobalite silica as used in Example 4 | | 20 kg |

A free flowing dispersion having a viscosity of 300 centipoise measured by the method described in Example 4 was obtained.

The following properties were measured using the test methods described in Example 6 on samples cut from moulded plaques:

| | | |
|---|---|---|
| Modulus | GPa | 7.3 |
| Failure Stress | MPa | 95 |
| Failure Strain | % | 2.5 |
| Impact Strength | kJ · m$^{-2}$ | 9.6 |

The average value for failure in the Thermal Shock test was 1640 cycles.

In the damage tolerance thermal shock test minor damage was observed at 240 cycles, and failure occurred at over 400 cycles.

EXAMPLE 7c

Example 7a was repeated using the following composition which has a slightly increased proportion of silylated Kraton.

| | | |
|---|---|---|
| Methyl methacrylate | | 7.365 kg |
| Ethylene glycol dimethacrylate | | 0.081 kg |
| Silylated Kraton FG1901X as prepared in Example 3 | | 1.000 kg |
| 3-(trimethoxysilyl)propylmethacrylate | | 0.080 kg |
| Stearic acid | | 0.045 kg |
| Cristobalite silica as used in Example 4 | | 20 kg |

A free flowing dispersion having a viscosity of 450 centipoise measured by the method described in Example 4 was obtained.

The following properties were measured using the test methods described in Example 6 on samples cut from moulded plaques:

| | | |
|---|---|---|
| Modulus | GPa | 7.1 |
| Failure Stress | MPa | 91 |
| Failure Strain | % | 3.3 |
| Impact Strength | kJ · m$^{-2}$ | 11.4 |

The average value for failure in the Thermal Shock test was 1790 cycles.

In the damage tolerance thermal shock test minor damage was observed at 250 cycles, and failure occurred at over 500 cycles.

Comparative Example C

The procedure of Example 7a was followed using a composition of the following ingredients:

| | |
|---|---|
| Methyl methacrylate | 7.45 kg |
| Ethylene glycol dimethacrylate | 0.092 kg |
| Kraton FG1901X | 0.92 kg |
| 3-(trimethoxysilyl)propylmethacrylate | 0.088 kg |
| Stearic acid | 0.045 kg |
| Cristobalite silica as used in Example 1 | 22 kg |

A free flowing dispersion was obtained, the viscosity measured by the method described in Example 4 was found to rise from 350 centipoise to 1020 centipoise over 7 days.

The following properties were measured using the test methods described in Example 6 on samples cut from moulded plaques:

| | | |
|---|---|---|
| Modulus | GPa | 10.0 |
| Failure Stress | MPa | 95 |
| Failure Strain | % | 2.0 |
| Impact Strength | kJ · m$^{-2}$ | 6.3 |

Sinks were tested in the damage tolerance thermal shock test, minor damage was observed at 231 cycles, and failure occurred at 464 cycles.

Comparative Example D

The following ingredients were mixed into 25 liter drums and rolled at approximately 30 rpm for 24 hours.

| | |
|---|---|
| Methyl methacrylate | 8.03 kg |
| Ethylene glycol dimethacrylate | 0.092 kg |
| Polymeric dispersant (95:5 methyl methacrylate:dimethylamino ethyl methacrylate, Mw 50,000 (GPC)) | 0.21 kg |
| Polymethyl methacrylate Mw 500,000 (GPC) | 0.18 kg |
| Stearic acid | 0.045 kg |
| Cristobalite silica as used in Example 4 | 22 kg |

A free flowing dispersion having a viscosity of 410 centipoise measured by the method described in Example 4 was obtained.

The dispersions were moulded and cured into a plaque and sinks as described in Example 6. The plaque was cut into specimens for mechanical property determination as described in Example 6. The values measured are recorded below:

| | | |
|---|---|---|
| Modulus | GPa | 12.6 |
| Failure Stress | MPa | 64 |
| Failure Strain | % | 0.5 |
| Impact Strength | kJ · m$^{-2}$ | 2.0 |

Sinks were tested in the thermal shock test and failed on average (4 tests) after 50 cycles.

In the damage tolerance thermal shock test no minor damage was observed before catastrophic failure at 30 cycles.

Comparative Example E

The following ingredients were mixed into 25 liter drums and rolled at approximately 30 rpm for 24 hours.

| | |
|---|---|
| Methyl methacrylate | 8.03 kg |
| Ethylene glycol dimethacrylate | 0.092 kg |
| Polymeric dispersant (95:5 methyl methacrylate:dimethylamino ethyl methacrylate, Mw 50,000 (GPC) | 0.21 kg |
| Polymethyl methacrylate Mw 500,000 (GPC) | 0.18 kg |
| 3-(trimethoxysilyl)propylmethacrylate | 0.022 kg |
| Stearic acid | 0.045 kg |
| Cristobalite silica as used in Example 4 | 22 kg |

A free flowing dispersion having a viscosity of 410 centipoise measured by the method described in Example 4 was obtained.

The dispersions were moulded and cured into a plaque and sinks as described in Example 6. The plaque was cut into specimens for mechanical property determination as described in Example 6. The values measured are recorded below:

| | | |
|---|---|---|
| Modulus | GPa | 12.5 |
| Failure Stress | MPa | 115 |
| Failure Strain | % | 1.0 |
| Impact Strength | kJ · m$^{-2}$ | 5.0 |

Sinks were tested in the thermal shock test and failed on average (>25 tests) 700 cycles.

In the damage tolerance thermal shock test no minor damage was observed before catastrophic failure at 30 cycles.

EXAMPLE 8

The following ingredients were mixed into 25 liter drums and rolled at approximately 30 rpm for 24 hours.

| | |
|---|---|
| Methyl methacrylate | 10.557 kg |
| Ethylene glycol dimethacrylate | 0.125 kg |
| Silylated Kraton FG1901X as prepared in Example 3 | 0.531 kg |
| 'Diakon' LS600 (Poly(methyl methacrylate), obtainable from ICI PLC | 0.548 kg |
| 3-(trimethoxysilyl)propyl methacrylate | 0.0846 kg |
| Stearic acid | 0.051 kg |
| Biotite 446 mica (mean particle size 300 micron) | 1.354 kg |
| Cristobalite silica as used in Example 4 | 22 kg |

The composition was somewhat thixotropic as indicated by the following Brookfield viscometer measurements on a no. 3 spindle:

| rpm | 6 | 12 | 30 |
|---|---|---|---|
| Viscosity (Poise) | 97 | 56 | 29 |

The dispersions were found to mould easily and cured into a plaque and sinks as described in Example 6.

Observation of the mouldings indicated that the large mica particles were evenly distributed in the moulding, indicating that despite the ease of moulding the material consequent upon its low viscosity under moulding conditions, the mica particles remained suspended during the curing operation. The mouldings had an attractive appearance resembling a natural stone. The plaque was cut into specimens for mechanical property determination as described in Example 6. The values measured are recorded below:

| Modulus | GPa | 9.1 |
|---|---|---|
| Failure stress | MPa | 107 |
| Failure strain | % | 1.2 |
| Impact strength | kJ · m$^{-2}$ | 4.9 |

Sinks were tested in the thermal shock test and had not failed catastrophically when taken off test after 1850 cycles although there was some evidence of surface crazing.

Comparative Example G

The following ingredients were mixed into 25 liter drums and rolled at approximately 30 rpm for 24 hours.

| Methyl methacrylate | 13.11 kg |
|---|---|
| Ethylene glycol dimethacrylate | 0.11 kg |
| Polymeric dispersant (95:5 methyl) methacrylate:dimethylaminoethyl methacrylate, M$_w$ 50000 (GPC) | 0.22 kg |
| 'Diakon' LS600 (poly(methyl methacrylate), obtainable from ICI PLC | 1.577 kg |
| 3-(trimethoxysilyl)propyl methacrylate | 0.022 kg |
| Stearic acid | 0.056 kg |
| Biotite 446 mica (as used in Example 8) | 1.481 kg |
| Cristobalite silica as used in Example 4 | 22 kg |

The viscosity of 1450 cP was obtained.

The dispersions were moulded and cured into a plaque and sinks as described in Example 6. The mica was observed to be evenly distributed in the moulding. The plaque was cut into specimens for mechanical property determination as described in Example 6. The values measured are recorded below:

| Modulus | GPa | 9.7 |
|---|---|---|
| Failure stress | MPa | 66 |
| Failure strain | % | 0.7 |
| Impact strength | kJ m$^{-2}$ | 2.6 |

Sinks were tested in the thermal shock test and failed on average after 60 cycles.

EXAMPLE 9

The following ingredients were mixed in a 25 liter drum and rolled at approximately 30 rpm for 24 hours.

| Methyl methacrylate | 7.45 kg |
|---|---|
| Ethylene glycol dimethacrylate | 0.092 kg |
| Silylated Kraton FG1901X as prepared in Example 3 | 0.92 kg |
| 3-(trimethoxysilyl)propyl methacrylate | 0.088 kg |
| Stearic acid | 0.045 kg |
| Biotite 446 Mica | 2.44 kg |
| Claytone PS-2 (as organophilic surface modified clay supplied by EEC International Ltd) | 0.092 kg |
| Cristobalite silica as used in Example 4 | 22 kg |

A thixotropic dispersion was obtained, the viscosity was measured at different shear rates using the Brookfield viscometer, and the results are shown below:

| Spindle RPM | Viscosity Poise |
|---|---|
| 6 | 145 |
| 12 | 105 |
| 30 | 75 |

The dispersions were moulded and cured into sinks as described in Example 6. The sinks were tested in the thermal shock test and survived 1800 cycles without failure.

We claim:

1. A highly, filled curable composition comprising
   (A) an addition polymerisable organic liquid which on curing forms a solid polymer;
   (B) 20 to 80% by volume of a finely divided particulate filler having a weight average particle size of less than 50 microns but not having a BET surface area of more than 30 m$^2$. cm$^{-3}$; and
   (C) a polymeric dispersant comprising
      (a) a polymeric component containing at least one segment of low Tg polymeric material having a Tg of less than 0° C. and
      (b) silicon containing groups of the formula (I)

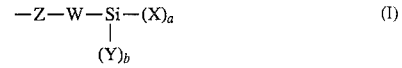

which are pendant from the polymeric component and wherein
   X is a hydrolysable group,
   Y is a hydrocarbyl radical,
   a is an integer of 1 to 3,
   b is 0 or an integer of 1 to 2 and a+b equals 3,
   Z is a group resulting from the reaction of a functional group pendant from the polymeric component and a corresponding reactive group on a precursor of the silicon containing group and
   W is a direct bond or a hydrocarbyl radical containing from 1 to 20 carbon atoms, which may optionally contain a functional group.

2. A curable composition as claimed in claim 1 in which the polymeric dispersant is from 0.2 and 7.0% by weight of the curable composition.

3. A curable composition as claimed in either claim 1 or claim 12 wherein the polymerisable organic liquid is one which cures to form a polymer having a glass transition temperature of at least 60° C.

4. A curable composition as claimed in claim 1 wherein the polymerisable organic liquid comprises at least one mono olefinically unsaturated monomer which is an acrylic or methacrylic acid ester having the formula $CH_2=C(R)CO.OR^2$ where R is H or methyl and $R^2$ is optionally substituted hydrocarbyl.

5. A curable composition as claimed in claim 1 wherein the polymerisable organic liquid comprises at least one polyolefinically unsaturated monomer so that the polymer which forms on curing the polymerisable organic liquid is a cross-linked polymer.

6. A curable composition as claimed in claim 5 wherein the least one polyolefinically unsaturated monomer is a poly(meth)acrylate ester of an organic polyol and (meth)acrylic acid having the formula:

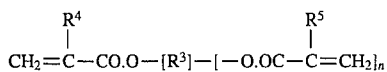

wherein $R^3$ is the hydroxy free residue of an organic polyol which comprised at least two hydroxyl groups in the molecule bonded to different carbon atoms:

$R^4$ and $R^5$ are each independently hydrogen or methyl; and n is an integer having a value of at least 1, preferably a value of from 1 to 3.

7. A curable composition as claimed in either claim 5 or claim 16 wherein the polymerisable organic liquid comprises from 0.2 to 20% by weight of the at least one polyolefinically unsaturated monomer and from 99.8 to 80% by weight of the at least one mono olefinically unsaturated monomer.

8. A curable composition as claimed in claim 1 wherein the inorganic filler is at least one amphoteric, basic or silicaceous filler.

9. A curable composition as claimed in claim 1 wherein the inorganic filler also comprises a coarse filler material.

10. A composite material obtained by curing a curable composition as claimed in claim 1.

11. A composite material as claimed in claim 10 wherein at least some of the at least one segment of low Tg polymeric material is present in a noncross-linked state.

12. A highly filled curable composition according to claim 1 wherein X is selected from halogen, alkyl carboxylate, alkoxy carbonyl and lower hydrocarbyl radicals.

13. A highly filled curable composition according to claim 1 wherein Y is an alkyl radical.

14. A highly filled curable composition according to claim 1 wherein the functional group pendant from the polymeric component through which the silicon containing group (I) is to be linked is selected from carboxylic acid, anhydride, hydroxyl ester, imide, amine, amide, epoxy, acid anhydride and vinyl groups.

15. A highly filled curable composition according to claim 1 wherein the functional group is pendant from the at least one segment of low Tg polymeric material.

16. A highly filled curable composition according to claim 1 wherein the precursor of the silicon containing group is selected from amine, mercapto, epoxy, anhydride and isocyanate groups.

17. A highly filled curable composition according to claim 1 wherein Z is the result of reacting an aminosilane precursor with an anhydride pendant functional group.

18. A highly filled curable composition according to claim 1 wherein the polymeric component is an optionally selectively hydrogenated vinyl aromatic/conjugated diene block copolymer.

19. A highly filled curable composition according to claim 1 wherein the polymeric component comprises polybutadiene units.

20. A highly filled curable composition according to claim 1 wherein the at least one segment of low Tg polymeric material has a molecular weight greater than 5000.

* * * * *